US006254929B1

(12) United States Patent
Duff et al.

(10) Patent No.: US 6,254,929 B1
(45) Date of Patent: Jul. 3, 2001

(54) PARTICULATE SURFACE TREATMENT PROCESS

(75) Inventors: James M. Duff, Mississauga (CA); Grazyna E. Kmiecik-Lawrynowicz, Fairport, NY (US); Guerino G. Sacripante, Oakville (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/731,235

(22) Filed: Dec. 6, 2000

Related U.S. Application Data

(62) Division of application No. 09/525,928, filed on Mar. 15, 2000, now Pat. No. 6,203,963.

(51) Int. Cl.[7] .................................................. C08K 5/11
(52) U.S. Cl. .................................................. 427/222
(58) Field of Search .................................. 427/222, 212

(56) References Cited

U.S. PATENT DOCUMENTS 5,334,644 * 8/1994 Gose et al. .......................... 427/222

* cited by examiner

*Primary Examiner*—John Goodrow
(74) *Attorney, Agent, or Firm*—E. O. Palazzo; John Haack

(57) ABSTRACT

A process including: treating a mixture comprising an aqueous dispersion of toner particles and a first solution of a water soluble alkyl carboxylate metal salt with a second solution of a water soluble metal salt.

2 Claims, No Drawings

PARTICULATE SURFACE TREATMENT PROCESS

This application is a divisional of application(s) Ser. No(s). 09/525,928, filed Mar. 15, 2000, now U.S. Pat. No. 6,203,963.

CROSS REFERENCE TO COPENDING APPLICATIONS AND RELATED PATENTS

Attention is directed to commonly owned and assigned U.S. Pat. No. 6,020,101, issued Feb. 1, 2000, entitled "Toner Composition and Process Thereof," which discloses a toner comprised of a core comprised a first resin and colorant, and thereover a shell comprised of a second resin and wherein the first resin is an ion complexed sulfonated polyester resin, and the second resin is a transition metal ion complex sulfonated polyester resin.

The disclosures of the above mentioned patent(s) is(are) incorporated herein by reference in its(their) entirety. The appropriate components and processes of the patent(s) may be selected for the toners and processes of the present invention in embodiments thereof.

BACKGROUND OF THE INVENTION

This invention relates generally to methods for controllably coating the surfaces of particles with smaller sized colloidal particles. More specifically the present invention relates to processes for forming colloidal particles of useful surface additives, such as an organocarboxylate metal salt and other lubricant or release agent additives, on the surface of suspended resin particles, such as toner particles.

The present invention in turn provides improved toner compositions and imaging processes thereof. The imaging processes of the present invention provide toners and methods of preventing or eliminating background deposits and spotted images and which spots are believed to arise from fugitive aforementioned lubricant or release agent additives that have escaped from the surface of the toner resin particles and result in objectionable deposits in the developer housing, on the imaging member, and on the image itself.

The toner compositions of the present invention in embodiments thereof possess excellent admix characteristics, maintain their triboelectric charging characteristics for an extended number of imaging cycles, and enable the elimination or minimization of undesirable background deposits or spots on the imaging member or photoconductor, and the image receiver sheet or copy paper. Furthermore, the toner compositions of the present invention are substantially insensitive to relative humidity in a machine environment and permit developed images with excellent optical densities and low background. Developers of the present invention are comprised of the aforementioned toners and carrier particles, especially carrier particles comprised of a core with a mixture of polymers thereover. The toner and developer compositions of the present invention can be selected for electrophotographic, especially xerographic and ionographic, imaging and printing processes and preferably ionographic version of magnetic image character recognition processes (MICR) such as processes similar to those selected for the Xerox Corporation 8790/9790 MICR machines, and preferably the Xerox Corporation 4135® MICR test fixture or machine, and wherein for example, personal checks with no, or minimal background deposits can be generated.

PRIOR ART

In U.S. Pat. No. 4,507,378, to Wada et al., issued Mar. 26, 1985, there is disclosed a method for producing a toner by polymerizing an aqueous suspension of a monomer in the presence of a dispersant selected from orthophosphate, pyrophosphate and polyphosphate, a colorant and an anionic surfactant. The polymerization product is then treated with dilute acid and rinsed with water whereby the dispersant is removed from the polymerization product.

In U.S. Pat. No. 4,476,210, to Croucher et al., there is disclosed a liquid developer comprising an amphipathic stabilizer polymer irreversibly anchored to a thermoplastic resin core of marking particles. The stabilizer has a soluble polymer backbone with an insoluble anchoring chain grafted onto the polymer backbone. The stabilizer may comprise an AB or ABA type block copolymer. The block copolymers may include siloxanes. The procedure for preparing the liquid developer comprises the steps of (1) preparation of the amphipathic stabilizer; (2) non-aqueous dispersion polymerization of the core monomer in the presence of the amphipathic stabilizer to provide stabilized particles; (3) dyeing of the non-aqueous dispersion particles; and (4) negatively charging the particles.

U.S. Pat. No. 6,020,101, issued Feb. 1, 2000, to Sacripante, et al., discloses a toner comprised of a core comprised a first resin and colorant, and thereover a shell comprised of a second resin and wherein the first resin is an ion complexed sulfonated polyester resin, and the second resin is a transition metal ion complex sulfonated polyester resin.

U.S. Pat. No. 6,017,668, issued Jan. 25, 2000, to Young, et al., discloses a toner comprised of resin, colorant, and a surface additive mixture of a magnetite and a polyvinylidene fluoride.

U.S. Pat. No. 3,900,588, issued Aug. 19, 1975, to Fisher et al., discloses an imaging technique and composition for developing electrostatographic latent images whereby a developer composition is employed comprising toner, a substantially smearless polymeric additive like KYNAR®, and an abrasive material surface additive such as silica, like AEROSIL R972®, or strontium titanate, see column 7, lines 12 to 17.

U.S. Pat. No. 5,437,955, issued Aug. 1, 1995, to Michlin, discloses a dry toner composition for electrophotography including a binder resin, a coloring agent and a mica-group mineral, which mineral provides the toner composition with lubricity and better flow capabilities. The mica-group mineral is wet ground and may be coated with calcium stearate to reduce static electricity generated during operation of the electrophotographic machine.

U.S. Pat. No. 4,395,485, issued Jul. 26,1983, to Kashiwage, et al., discloses a one component type dry developer for electrophotography which is improved on humidification, and consists of a mixture of toner with a particle size of about 5 to 50 microns and a hydrophobic flow agent. The flow agent is made by coating inorganic, organic, metallic or an alloy powder with a thin film of non-hydrophilic synthetic resin. A flow agent having non-hydrophilic and electrically conductive properties is obtained.

U.S. Pat. No. 4,748,474, issued May 31, 1988, to Karematusu, et al., discloses an imaging forming method and apparatus using an image bearing member, movable along an endless path, for bearing a toner image and having a critical surface tension of not more than 33 dyne/cm, wherein the toner image formed on the image bearing member by a developer containing toner not less than 70% of which has a particle size of 1–5 microns, and lubricant in an amount not less than 0.5% by weight of the toner, and the image bearing member is cleaned by removing the toner image remaining on the image bearing member.

U.S. Pat. No. 5,079,123, issued Jun. 7, 1992, to Nanya, et al., discloses a dry-type toner for electrophotography comprising a binder resin, a coloring agent, and, as a lubricant, a carnauba wax substantially free of free aliphatic acids. The toner may further comprised a magnetic material, and the resulting toner mixture can be used as a magnetic toner.

U.S. Pat. No. 6,017,671, issued Jan. 25, 2000, to Sacripante, et al., a toner composition comprised of a polyester resin with hydrophobic end groups, colorant, optional wax, optional charge additive, and optional surface additives.

The aforementioned patents are incorporated in their entirety by reference herein.

Other patents of interest follow. The following U.S. Patents disclose the addition of zinc stearate to the surface of toners by blending to control the toner resistivity and in some instances to provide for toner release in the developer: U.S. Pat. Nos. 5,043,240; 5,045,428; 5,135,832; and 5,023,159. Toners and developers with surface additives of metal salts of fatty acids like zinc stearate and silica are known, reference for example U.S. Pat. Nos. 3,983,045 and 3,590,000. The commonly owned and assigned U.S. Pat. No. 3,983,045, issued Sep. 28, 1976, to Jugle et al., discloses a developer composition comprising 1) electroscopic toner particles, 2) a friction-reducing material, such as fatty acids, metal salts of fatty acids, fatty alcohols, fluorocarbon compounds, polyethylene glycols, and the like, of a hardness less than the toner and having greater friction-reducing characteristics than the toner material, and 3) a finely divided nonsmearable abrasive material, such as, colloidal silica, surface modified silica, titanium dioxide, and the like metal oxides, of a hardness greater than the friction-reducing and toner material. In U.S. Pat. No. 4,789,613, there is illustrated a toner with an effective amount of, for example, strontium titanate dispersed therein, such as from about 0.3 to about 50 weight percent. Also disclosed in the '613 patent is the importance of the dielectric material with a certain dielectric constant, such as strontium titanate, being dispersed in the toner and wherein the surface is free or substantially free of such materials. Further, this patent discloses the use of known charge controllers in the toner, see column 4, line 55, olefin polymer, see column 5, line 35, and a coloring agent like carbon black as a pigment. Treated silica powders for toners are illustrated in U.S. Pat. No. 5,306,588. Toners with waxes like polypropylene and polyethylene are, for example, illustrated in U.S. Pat. Nos. 5,292,609; 5,244,765; 4,997,739; 5,004,666 and 4,921,771, the disclosures of which are totally incorporated herein by reference. Magnetic toners with low molecular weight waxes and external additives of a first flow aid like silica and metal oxide particles are illustrated in U.S. Pat. No. 4,758,493, the disclosure of which is totally incorporated herein by reference. Examples of metal oxide surface additives are illustrated in column 5, at line 63, and include strontium titanate. Single component magnetic toners with silane treated magnetites are illustrated in U.S. Pat. No. 5,278,018, the disclosure of which is totally incorporated herein by reference. In column 8 of the '018 patent, there is disclosed the addition of waxes to the toner and it is indicated that surface additives such as AEROSIL®, metal salts of fatty acids and the like can be selected for the toner. Magnetic image character recognition processes and toners with magnetites like MAPICO BLACK® are known, reference for example U.S. Pat. No. Re. 33,172, the disclosure of which is totally incorporated herein by reference, and U.S. Pat. No. 4,859,550. The 33,172 patent also discloses certain toners with AEROSIL® surface additives. The toners and developers of the present invention may in embodiments be selected for the MICR and xerographic imaging and printing processes as illustrated in the 33,172 patent. Moreover, toners with charge additives are known. Thus, for example, there is described in U.S. Pat. No. 3,893,935, the use of quaternary ammonium salts as charge control agents for electrostatic toner compositions. In this patent, there are disclosed quaternary ammonium compounds with four R substituents on the nitrogen atom, which substituents represent an aliphatic hydrocarbon group having 7 or less, and preferably about 3 to about 7 carbon atoms, including straight and branch chain aliphatic hydrocarbon atoms, and wherein X represents an anionic function including, according to this patent, a variety of conventional anionic moieties such as halides, phosphates, acetates, nitrates, benzoates, methylsulfates, perchlorate, tetrafluoroborate, benzene sulfonate, and the like; U.S. Pat. No. 4,221,856, which discloses electrophotographic toners containing resin compatible quaternary ammonium compounds in which at least two R radicals are hydrocarbons having from 8 to about 22 carbon atoms, and each other R is a hydrogen or hydrocarbon radical with from 1 to about 8 carbon atoms, and A is an anion, for example, sulfate, sulfonate, nitrate, borate, chlorate, and the halogens such as iodide, chloride and bromide, reference the Abstract of the Disclosure and column 3; a similar teaching is presented in U.S. Pat. No. 4,312,933, which is a division of U.S. Pat. No. 4,291,111; and similar teachings are presented in U.S. Pat. No. 4,291,112, wherein A is an anion including, for example, sulfate, sulfonate, nitrate, borate, chlorate, and the halogens. Also, there is disclosed in U.S. Pat. No. 4,338,390, the disclosure of which is totally incorporated herein by reference, developer compositions containing as charge enhancing additives organic sulfate and sulfonates, which additives can impart a positive charge to the toner composition. Further, there is disclosed in U.S. Pat. No. 4,298,672, the disclosure of which is totally incorporated herein by reference, positively charged toner compositions with resin particles and pigment particles, and as charge enhancing additives alkyl pyridinium compounds. Additionally, other documents disclosing positively charged toner compositions with charge control additives include U.S. Pat. Nos. 3,944,493; 4,007,293; 4,079,014 4,394,430 and 4,560,635, which illustrates a toner with a distearyl dimethyl ammonium methyl sulfate charge additive. Moreover, toner compositions with negative charge enhancing additives are known, reference for example U.S. Pat. Nos. 4,411,974 and 4,206,064, the disclosures of which are totally incorporated herein by reference. The '974 patent discloses negatively charged toner compositions comprised of resin particles, pigment particles, and as a charge enhancing additive ortho-halo phenyl carboxylic acids. Similarly, there are disclosed in the '064 patent toner compositions with chromium, cobalt, and nickel complexes of salicylic acid as negative charge enhancing additives. There is illustrated in U.S. Pat. No. 4,404,271 a complex system for developing electrostatic images with a toner which contains a metal complex represented by the formula in column 2, for example, and wherein ME can be chromium, cobalt or iron. Additionally, other patents disclosing various metal containing azo dyestuff structures wherein the metal is chromium or cobalt include U.S. Pat. Nos. 2,891,939; 2,871,233; 2,891,938; 2,933,489; 4,053,462 and 4,314,937. Also, in U.S. Pat. No. 4,433,040, the disclosure of which is totally incorporated herein by reference, there are illustrated toner compositions with chromium and cobalt complexes of azo dyes as negative charge enhancing additives. Further, TRH as a charge additive is illustrated in a number of patents, such as U.S. Pat. No. 5,278,018, the disclosure of which is totally incorporated herein by reference.

There remains a need for toners and developer compositions with improved image quality and reduced image distortion and background deposits. There also remains a need for toners with, for example, superior flow, environmental stability, and charging properties, and imaging processes thereof, and which toners are substantially insensitive to relative humidity, possess excellent admix characteristics, stable $A_t$ properties, no evidence of background deposits when the toner is selected for the development of images after about 1 million imaging cycles, or when the toner is tested in an aging fixture for more than about 100 hours, and which toners are useful for the development of electrostatic or ionographic latent images, or which toners can preferably be selected for MICR methods, and wherein personal checks with no or minimal background deposits are generated.

The aforementioned and other advantages are achievable with the toners and preparative and imaging processes of the present invention. The compositions and processes of the present invention are useful in many applications including printing, for example, particulate based ink jet and electrostatographic, such as in xerographic and ionographic printers and copiers, including digital systems.

SUMMARY OF THE INVENTION

Embodiments of the present invention, include:

A process comprising: treating a mixture comprising an aqueous dispersion of toner particles and a first solution of a water soluble alkyl carboxylate metal salt with a second solution of a water soluble metal salt;

A process comprising: forming colloidal particles of an organocarboxylate metal salt on the surface of suspended resin particles;

A process comprising: mixing an aqueous dispersion of resin particles and a first solution of a water soluble fatty acid metal salt with a second solution of a water soluble metal salt to form a dispersion of resin particles with finely dispersed colloidal particles of a water insoluble fatty acid metal salt adhering to the surface of the resin particles; and Toners, developers, and imaging processes that include resin particles containing a colorant, and particles comprised of fatty acid metal salt residing on the surface of the toner particles, onto a charged image receiving member, and wherein the resulting images are free of background deposits or fog and have improved image quality.

These and other aspects are achieved, in embodiments, of the present invention as described and illustrated herein.

DETAILED DESCRIPTION OF THE INVENTION

In embodiments the present invention provides a process comprising: treating a mixture comprising an aqueous dispersion of toner particles and a first solution of a water soluble alkyl carboxylate metal salt with a second solution of a water soluble metal salt. The surfaces of the resulting toner particles can be uniformly coated, if desired, with colloidal particles of an insoluble alkyl carboxylate metal salt that forms in situ. Considerations which are readily evident to one of ordinary skill in the art in accomplishing a uniform coating include, for example, the surface area and particle size of the toner particles to be coated, the stoichiometry of the reaction of the first solution of a water soluble alkyl carboxylate metal salt with a second solution of a water soluble metal salt in the in situ formation of the insoluble alkyl carboxylate metal salt; the colloidal particle size and surface area coverage obtainable by the in situ formation of the insoluble alkyl carboxylate metal salt; the extent of toner particle surface coverage desired, for example, incomplete surface coverage, a monolayer, bilayers, higher multiple layers; and the like considerations. Generally for low level surface area coverages, such as monolayers, the colloidal particles of the insoluble alkyl carboxylate metal salt adhere tightly to the surface of the resin particles. Tight adherence of the colloidal particles of insoluble alkyl carboxylate metal salt to the toner particle surface is a preferred embodiment of the present invention. Tight adherence can be promoted or ensured by, for example, considering thermodynamic conditions in the colloidal particle formation and deposition, such as, having an excess of toner particles present relative to the reactants during the colloid formation and which toner particles effectively serve as nucleation loci. Additionally or alternatively, the colloidal particles are preferably formed at a relatively slow rate in the presence of toner particles relative to the formation of colloidal particles in the absence of available toner particle surface. Formation of colloidal particles in isolated suspension or at high dilution of either reactants or toner particles typically leads to the formation of very small colloidal particles and particles are less likely to be tightly held to the surface of the toner particles. Conversely, formation of colloidal particles at intermediate or high concentration of soluble reactant and in the presence of substantial numbers of suspended toner particles typically leads to the formation of intermediate or larger sized colloidal particles and the colloidal particles are more likely to be, or entirely, tightly held to the surface of the toner particles.

The water soluble metal salt reactant provides the soluble metal that in combination with the water soluble organic acid produces the water insoluble product that forms the colloidal particles at or near the surface of the toner particles. The water soluble metal salt reactant can be, for example, zinc halides, zinc carboxylate compounds, and mixtures thereof, such as zinc chloride, zinc bromide, zinc iodide, zinc acetates, zinc acetoacetates, and the like compounds. A preferred water soluble metal salt for use in forming the water insoluble metal salt colloidal particles of the present invention is zinc chloride.

The water soluble alkyl carboxylate metal salt is the counterpart or co-reactant of the aforementioned water soluble metal salt that is required for the formation of the insoluble metal salt colloidal particles of the present invention. The water soluble alkyl carboxylate metal salt can be, for example, a metal stearate compound, such as, sodium stearate, potassium stearate, cesium stearate, rubidium stearate, lithium stearate, berylium stearate, magnesium stearate, calcium stearate, barium stearate, and the like compounds, and mixtures thereof. A preferred water soluble alkyl carboxylate metal salt useful in forming the water insoluble metal salt colloidal particles of the present invention is sodium stearate. It is readily apparent to one of ordinary skill in the art that other water soluble organic carboxylate metal salts, such as homologs and analogs of water soluble metal stearate compounds, can be substituted to achieve the same or similar results as those achieved with metal stearate compounds.

The toner particles can be comprised of a suitable colorant, such as dyes, pigments, or mixtures thereof, and any suitable known resin. Preferred resins include, for example, poly(styrene-acrylate) polymers, poly(styrene-butadiene) polymers, polyester polymers, and mixtures thereof. The poly(styrene-acrylate) resins can be comprised of, for example, unsaturated monomers such as styrenes, lauryl methacrylate, methyl acrylate, ethyl acrylate, propyl acrylate, butyl acrylate, hexyl acrylate, stearyl acrylate, alkacrylate esters and acids, acrylic acids, alkacrylic acids, bis-methylacryloxy terminated polydimethylsiloxanes, and mixture thereof.

The toner particles can have an average diameter, for example, of from about 1 to about 1,000 microns and are obtainable from known conventional toner formation and processing methods. The organocarboxylate metal salt colloidal particles can have an average diameter, for example, of from about 0.001 to about 10 microns and are obtainable from processing methods as illustrated herein.

It is readily evident to one of ordinary skill in the art that the process of the present invention can include additional known processing steps, for example, further isolation, washing, drying, dry surface treatment, and the like steps, of the resulting colloidal particle coated toner particles.

In embodiments, a preferred toner particles are comprised at least one resin which contains on or more ionizable groups, that is known ion-exchangeable groups, such as, carboxylic acid groups, dicarboxylic acid groups, sulfonic acid groups, sulfate groups, and the like groups, and mixtures and combinations thereof. Although not wanting to be limited by theory, it is believed that the ionizable or ion-exchangeable resin surface groups can promote colloidal particle formation and provide nucleation loci, by providing either or both a substantive surface and ionizable groups in close proximity to a substantive surface on the toner particles surface. Thus the toner compositions disclosed in the aforementioned U.S. Pat. No. 6,020,101, to Sacripante, et al., can be selected as the resin particles for use in the present invention with the result that the in situ formed, or deposited, colloidal particulates of the insoluble fatty acid metal salt can, for example, associate, interact, or ionically bond with certain of the ionizable or ion-exchangeable groups of the resin that reside on the surface of the toner particles.

In embodiments the present invention provides a process comprising: forming colloidal particles of an organocarboxylate metal salt on the surface of suspended toner particles. In embodiments the present invention provides a process comprising: mixing an aqueous dispersion of toner particles and a first solution of a water soluble fatty acid metal salt with a second solution of a water soluble metal salt to form a dispersion of resin particles with finely dispersed colloidal particles of a water insoluble fatty acid metal salt that strongly or tightly adheres to the surface of the resin particles.

In embodiments the present invention, the amount of zinc stearate or other insoluble metal salt of a fatty acid which is deposited or coated in colloidal form on the surface of the toner particle, can be, for example, in an amount of from about 0.5 to about 5 weight percent based on the weight of the toner particles, and preferably, of from about 1 to about 4 weight percent of the toner.

In other embodiments of the present invention, other known surface additives can be included and added in combination with the zinc stearate or other insoluble metal salt of a fatty acid on the toner surface, for example, by separately or concurrently spray coating a dispersion of conductive colloidal graphite, carbon black, or a polymeric binder, or by for example, dry blending other surface additives such as metal oxides and surface treated metal oxides, such as, tin oxide, and the like additives.

In embodiments the present invention provides a toner composition prepared in accordance with the above described coating process.

In embodiments the present invention provides a developer composition comprising a toner and carrier particles as illustrated herein.

It is readily appreciated by those skilled in the art of colloidal particulate coating technology that the present invention is well suited for coating treatment of same or similar powder or particulate materials, for example cement, flour, cocoa, herbicides, pesticides, pharmaceuticals, cosmetics, and the like materials.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

PREPARATION OF AN ENCAPSULATED TONER

A mixture of 116 grams of lauryl methacrylate monomer, 13.0 grams of methacryloxypropyl terminated polydimethylsiloxane cross linking agent, 1.58 grams of 2,2'-azobis-(2,4-dimethylvaleronitrile) initiator and 1.58 grams of 2,2'-azobisisobutronitrile initiator was mixed in a 2 liter plastic container with a Brinkman polytron equipped with a PT 35/4 probe at 6,000 rpm for 1 minute before 47.1 grams of Isonate 143L, a shell co-reactant component of 4,4-methyidiphenyl diisocyanate, available from Dow Chemical Company, was added and mixed for an additional 30 seconds. Next, 300 grams of iron oxide was added, and the resulting mixture was homogenized by high shear blending with the above Brinkman polytron at 8,000 rpm for 5 minutes. To resulting mixture was added 1 liter of 0.22 percent by weight of aqueous poly(vinyl alcohol)(88% hydrolyzed; weight average molecular weight of 96,000) solution, and thereafter the combined mixture was blended at 9,000 rpm with an IKA polytron equipped with a T45/G probe for 2 minutes. This mixture was transferred to a 3 liter reaction kettle immersed in an oil bath and equipped with a mechanical stirrer. About 22 mL of Dytek A, a shell co-reactant component of 2-methyl-pentanediamine available from DuPont, in 80 mL of water was added to the stirred suspension at 250 rpm over a period of 30 seconds to initiate a shell forming polycondensation reaction. After the addition of the amine, the solution was allowed to stir at room temperature for one hour to complete the shell formation. Then the mixture was heated in the oil bath to initiate free radical polymerization of the core monomers. The temperature was gradually raised from room temperature to about 85° C. over about 1 hour. Heating was continued for about 6 hours at 85° C. The reaction mixture was allowed to cool to room temperature and the slurry was transferred to a 4 liter beaker and worked up with 3 liters of water. The mixture was allowed to stand for 45 minutes or until all of the toner had settled out of suspension. The water layer was then decanted. This water washing procedure was repeated twice more. The residual solids mixture was passed through a 180 micron sieve to remove coarse material and washed twice more using the washing procedure. The wet toner particles were then transferred to a 2 liter beaker and then diluted with water to a total volume of 1,800 mL. Several milliliters were sampled for particle size analysis and a 10 mL sample was selected for solids determination.

EXAMPLE II

IN SITU DEPOSITION OF COLLOIDAL ZINC STEARATE ONTO TONER

A clear solution of 3.31 grams of potassium stearate in 400 mL of deionized water was prepared by stirring with gentle warming. The solution was added to a suspension of 216 grams of the toner prepared in Example I contained in 400 mL of water. This mixture was stirred vigorously while a solution previously prepared from 70 grams zinc chloride (anhydrous) and 150 mL of water, was slowly added dropwise into the suspension over about 20 minutes. The resulting dispersion was diluted to 4 liters and the solids allowed to settle out. Next, the water was decanted and the solids were resuspended in 4 liters of water. The toner was allowed to settle and the water layer again decanted. The resultant toner particles were dispersed in 400 mL of water and then Aquadag E, a water based dispersion of conductive colloidal graphite or carbon black, and a polymeric binder available from Acheson Colloids, 19.25 grams, diluted with 100 mL of water was added. The slurry was then diluted to about 1,800 mL of water and was spray dried in a Yamato Spray Dryer using an inlet temperature of 170° C., and an outlet temperature of 76° C. and an air flow of 0.75 cubic meters per minute. The collected product, 200 grams, was sieved through a 63 micron screen to obtain a toner having a volume average particle size of 18.2 microns with a GSD of about 1.27. The volume resistivity was about $2.33 \times 10^8$ ohm-cm. A sample of 170 grams of the above toner was treated with 0.15 grams of carbon black, Black Pearls 2000, from DEGUSSA, using a Greey blender for 2 minutes at an impeller speed of 3,500 rpm. The volume resistivity of the final toner was $4.5 \times 10^5$ ohm-cm.

The electron microscopic examination of the resulting stearated toners indicated that the toner particles had smooth surfaces and there no evidence of flakes present on the toner surface. The stearated toner was then evaluated in a Xerox 4060™ printer. The toned images were transfixed onto paper with a transfix pressure of about 4,000 psi. The printer was operated at 90 prints per minute for a duration of about 1 hour, where after no build up of zinc stearate was noted on the developer housing, the image drum, the blending chamber, or the sieve.

COMPARATIVE EXAMPLE III

PREPARATION OF ZINC STEARATED TONER BY DRY BLENDING

About 240.0 grams dry toner of Example I, and 0.84 grams (35 percent) of carbon black (Pearls CB 2000) were blended using a Greey Master blender for 2 minutes at an impeller speed of about 3,500 rpm. Zinc stearate, 3.6 grams (1.5 weight percent) was added and the blending continued with an impeller speed of about 3,000 rpm for about 30 minutes to give a toner with a volume resistivity of about $2.0 \times 10^5$ ohm-cm.

Electron microscopic examination of the dry blended toner of this comparative example indicated the presence of some zinc stearate flakes on the toner surface. Also the agglomeration of toner particles appears to be greater for the dry blend zinc stearate treated toner particles compared to the in situ treated particles.

The stearated toner particle of this example were evaluated in a Xerox 4060tm printer. The toned images were transfixed onto paper with a transfix pressure of 4,000 psi. The printer was operated at about 90 prints per minute for a duration of about 1 hour, during which a slight build up of zinc stearate material appeared on the image drum and the developer housing and required removal at about every 100 copies. There was also zinc stearate build up noted in the blending chamber and on the sieve used for dry toner formulation.

EXAMPLE IV

IN SITU COATING OF TONERS CONTAINING IONIC RESINS

In embodiments of the present invention the toner composition disclosed in the aforementioned U.S. Pat. No. 6,020,101, to Sacripante, et al., can be selected as the resin particles for use as toner particle resin in the present process invention with the result that the insoluble in situ formed, or deposited, colloidal particulates of the fatty acid metal salt can, for example, associate, interact, or ionically bond with certain of the ionizable hydrophilic groups of the resin that reside on the surface of the toner particles to provide nucleation loci and ion-exchangeable sites that facilitate surface formation and adherence of the colloidal particles to the toner particle surface.

Other modifications of the present invention may occur to one of ordinary skill in the art based upon a review of the present application and these modifications, including equivalents thereof, are intended to be included within the scope of the present invention.

What is claimed is:

1. A process comprising: mixing an aqueous dispersion of resin particles and a first solution of a water soluble fatty acid metal salt with a second solution of a water soluble metal salt to form a dispersion of resin particles with finely dispersed colloidal particles of a water insoluble fatty acid metal salt adhering to the surface of the resin particles.

2. A process comprising: forming colloidal particles of an organo-carboxylate metal salt on the surface of suspended resin particles.

* * * * *